United States Patent
Wang et al.

(10) Patent No.: US 12,447,136 B2
(45) Date of Patent: Oct. 21, 2025

(54) USE OF (5R,7R,10R)-12,15-DIOXO-α-SELINENE IN THE PREPARATION OF DRUGS

(71) Applicant: KUNMING INSTITUTE OF BOTANY, CHINESE ACADEMY OF SCIENCES, Kunming (CN)

(72) Inventors: Yuehu Wang, Kunming (CN); Jifeng Luo, Kunming (CN); Qian He, Kunming (CN); Lu Zhang, Kunming (CN); Shuya Wei, Kunming (CN); Mengyuan Xia, Kunming (CN)

(73) Assignee: KUNMING INSTITUTE OF BOTANY, CHINESE ACADEMY OF SCIENCES, Kunming (CN)

( * ) Notice: Subject to any disclaimer, the term of this patent is extended or adjusted under 35 U.S.C. 154(b) by 498 days.

(21) Appl. No.: 17/784,637

(22) PCT Filed: Jun. 1, 2021

(86) PCT No.: PCT/CN2021/097614
§ 371 (c)(1),
(2) Date: Jun. 11, 2022

(87) PCT Pub. No.: WO2021/249236
PCT Pub. Date: Dec. 16, 2021

(65) Prior Publication Data
US 2023/0404946 A1    Dec. 21, 2023

(30) Foreign Application Priority Data
Jun. 8, 2020 (CN) .......................... 202010512412.9

(51) Int. Cl.
| A61K 31/11 | (2006.01) |
| A23L 33/10 | (2016.01) |
| A61P 25/28 | (2006.01) |

(52) U.S. Cl.
CPC .............. *A61K 31/11* (2013.01); *A23L 33/10* (2016.08); *A61P 25/28* (2018.01)

(58) Field of Classification Search
None
See application file for complete search history.

(56) References Cited

FOREIGN PATENT DOCUMENTS

| CN | 110123858 | 8/2019 |
| CN | 111529515 | 8/2020 |

OTHER PUBLICATIONS

CAS RN 76235-89-7 (entered into STN on Nov. 16, 1984) (Year: 1984).*
Li et al (Fitoterapia 100:44-49, 2015) (Year: 2015).*
Shao et al (Fitoterapia 113:182-187, 2016) (Year: 2016).*
Laar et al (CNS Neuroscience & Therapeutics 17:428-441, 2011) (Year: 2011).*
Kandiah et al (Clinical Investigations in Aging 12:697-7074, 2017) (Year: 2017).*
Henderson et al (Lancet Neurol 15:249-258, 2016) (Year: 2016).*
"International Search Report for PCT/CN2021/097614 filed Jun. 1, 2021," mailed Dec. 16, 2021, 3 pages.
Zhao, Huan, et al.,"Three new sesquiterpenoids and one new sesquiterpenoid derivative from Chinese eaglewood," Molecules, vol. 21, No. 3, Dec. 31, 2016 (Dec. 31, 2016) , ISSN: 1420-3049, 281/1-281/8.
Shao, Hang, et al.,"Sesquiterpenes of agarwood from Gyrinops salicifolia," Fitoterapia, vol. I I 3, Dec. 31, 2016 (Dec. 31, 2016) , ISSN: 0367-326X, 182-187.

* cited by examiner

*Primary Examiner* — Craig D Ricci
(74) *Attorney, Agent, or Firm* — Jennifer Stachniak; Johnson, Marcou, Isaacs & Nix, LLC

(57) ABSTRACT

(5R,7R,10R)-12,15-dioxo-α-selinene (PFC-37) is used in the preparation of a drug for preventing and treating a neurodegenerative disease and Parkinson's disease.

13 Claims, No Drawings

USE OF (5R,7R,10R)-12,15-DIOXO-α-SELINENE IN THE PREPARATION OF DRUGS

CROSS REFERENCE TO RELATED APPLICATION

This patent application claims the benefit and priority of Chinese Patent Application No. 202010512412.9 filed on Jun. 8, 2020 and entitled "Use of (5R,7R,10R)-12,15-dioxo-α-selinene In the Preparation of Drugs", the disclosure of which is incorporated by reference herein in its entirety as part of the present application.

TECHNICAL FIELD

The present disclosure belongs to the technical field of medicines, and in particular relates to use of (5R,7R,10R)-12,15-dioxo-α-selinene in the preparation of a drug for preventing and treating a neurodegenerative disease.

BACKGROUND ART

Parkinson's disease is a common neurological disease in middle-aged and elderly people. At present, the Parkinson's disease is treated mainly by levodopa replacement therapy; however, this therapy cannot prevent progression of Parkinson's disease, has a efficacy which begins to decline after 3-5 years, results in adverse reactions such as anorexia, nausea, dizziness, mental disorders and dyskinesia in the early stage, and may lead to "on-off phenomenon", end-of-dose phenomenon and dystonia under a long-term use [Sun Jing, Xiong Hang, Yao Yuxi. *Progress in the Treatment of Parkinson's Disease. Medical Review,* 2020, 26 (2): 1157-1160, 1165]. Therefore, seeking novel therapeutic drugs and methods has been a hot and difficult point of research.

1-methyl-4-phenylpyridinium ion ($MPP^+$-induced PC12 cell injury model is currently recognized as a screening model for therapeutic drugs of the Parkinson's disease [a. Delavar M R, Baghi M, Safaeinejad Z, Kiani-Esfahani A, Ghaedi K, Nasr-Esfahani M H. *Differential Expression of miR-34a, miR-141, and miR-9 in $MPP^+$ treated Differentiated PC12 Cells as a Model of Parkinson's Disease.* Gene, 2018, 662:54-65; b. Lin K-H, Li C-Y, Hsu Y-M, Tsai C-H, Tsai F-J, Tang C-H, Yang J-S, Wang Z-H, Yin M-C. *Oridonin, Anatural Diterpenoid, Protected NGF-differentiated PC12 Cells against $MPP^+$-and Kainic Acid-induced Injury. Food and Chemical Toxicology,* 2019, 133: 110765].

To date, the prior art does not report that sesquiterpenoid PFC-37 ((5R,7R,10R)-12,15-dioxo-α-selinene) has activity on neurodegenerative disease and Parkinson's disease.

SUMMARY

In the present disclosure, it is found that sesquiterpenoid PFC-37 has a significant protective effect on $MPP^+$-induced PC12 cell injury when screening pharmacologically active ingredients using the $MPP^+$-induced PC12 cell injury model. The effect of PFC-37 is reported for the first time. An object of the present disclosure is to provide use of PFC-37 in the preparation of a drug for preventing and treating a neurodegenerative disease and in the preparation of a drug for preventing and treating Parkinson's disease.

To achieve the above object, the present disclosure provides the following technical solutions:

The present disclosure provides a pharmaceutical composition for preventing and/or treating a neurodegenerative disease, comprising (5R,7R,10R)-12,15-dioxo-α-selinene and a pharmaceutically acceptable carrier.

The present disclosure further provides a pharmaceutical composition for preventing and/or treating Parkinson's disease, comprising (5R,7R,10R)-12,15-dioxo-α-selinene and a pharmaceutically acceptable carrier.

The present disclosure further provides a dietary supplement composition, comprising (5R,7R,10R)-12,15-dioxo-α-selinene and a food adjuvant.

The present disclosure further provides use of (5R,7R,10R)-12,15-dioxo-α-selinene in the preparation of a drug for preventing and/or treating a neurodegenerative disease.

The present disclosure further provides use of (5R,7R,10R)-12,15-dioxo-α-selinene in the preparation of a drug for preventing and/or treating Parkinson's disease.

In the present disclosure, the pharmaceutically acceptable carrier refers to a conventional pharmaceutical carrier in the field of medicines, such as water, glucose, lactose, acacia and other carriers suitable for preparation of a formulation in a form selected from the group consisting of solid, semi-solid, liquid and aerosol. The composition may additionally comprise a stabilizer, a thickener, and/or a colorant, and a flavor.

In the present disclosure, a composition prepared from the compound (5R,7R,10R)-12,15-dioxo-α-selinene and a pharmaceutically acceptable carrier may be administered orally or non-orally, with a dosage varying with different drugs. For an adult, a dosage of 1 mg to 100 mg per day may be more appropriate.

For oral administration, the compound is firstly mixed with a conventional pharmaceutical adjuvant such as an excipient, a disintegrant, an adhesive, a lubricant, an antioxidant, a coating agent, a colorant, a flavoring agent and a surfactant, to obtain formulations such as a granule, a capsule and a tablet for administration. For non-oral administration, formulations such as an injection, an infusion and a suppository may be used. The above formulations can be prepared using conventional formulation techniques.

In the present disclosure, the compound (5R,7R,10R)-12,15-dioxo-α-selinene may be used directly or in the form of a composition when being used as a drug or health care product. The pharmaceutical composition comprises 0.1% to 99%, preferably 0.5% to 90% of the compound (5R,7R,10R)-12,15-dioxo-α-selinene, with the rest being pharmaceutically acceptable, non-toxic and inert carriers and/or excipients for humans and animals, or daily food additives and matrixes.

DETAILED DESCRIPTION OF THE EMBODIMENTS

The present disclosure is further described below in conjunction with specific examples, which are not to be construed as limiting the present disclosure.

Example 1

Compound PFC-37 was prepared as follows:

2.9 kg of heart wood of a dried traditional Chinese medicine *Aquilaria sinensis* (Lour.) Spreng. was crushed, followed by ultrasonic extraction with 90% ethanol at 60° C. for 30 min to obtain 459.3 g of a concentrated crude extract. The concentrated crude extract was suspended in water, followed by extraction with equal volumes of petroleum ether, ethyl acetate and n-butanol in sequence, and solvents were recovered to obtain 0.7 g of a petroleum ether extract, 374.8 g of an ethyl acetate extract and 52.5 g of an n-butanol extract.

374.8 g of the ethyl acetate extract was mixed with an equal amount of 80-100-mesh silica gel, and separated with a normal phase silica gel column chromatography by a gradient elution with a petroleum ether-ethyl acetate system as an eluent (which is used with volume ratios of petroleum ether to ethyl acetate of 50:1, 30:1, 20:1, 10:1, 5:1, 3:1, 2:1, 1:1 and 0:1) and then an elution with an ethyl acetate-methanol system as an eluent (which is used with volume ratios of ethyl acetate to methanol of 5:1, 3:1, 2:1, 1:1 and 0:1). The same components were combined through thin-layer chromatography (TLC) to obtain 5 parts labelled as Fr.Y-1, Fr.Y-2, Fr.Y-3, Fr.Y-4, and Fr.Y-5.

2.5 g of the Fr.Y-1 were subjected to medium pressure RP-18 reverse phase silica gel column chromatography (methanol-water, which is used with volume ratios of methanol to water of 10% to 100%), and same fractions were combined through the TLC to obtain 4 parts labelled as Fr.Y-1-1, Fr.Y-1-2, Fr.Y-1-3, and Fr.Y-1-4. 138.1 mg of the Fr.Y-1-1 were subjected to Sephadex LH-20 gel column chromatography (methanol) to obtain 130.2 mg of the compound PFC-37 having a chemical structural formula as shown below:

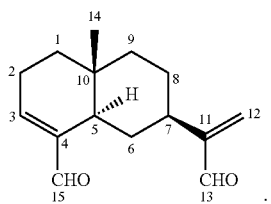

The compound PFC-37, with a chemical name of (5R, 7R,10R)-12,15-dioxo-α-selinene, is a colorless oil and has a molecular formula $C_{15}H_{20}O_2$, a CAS number of 76235-89-7, and spectral data as follows: $[\alpha]_D^{22}$ −47.7(c 0.12, MeOH); ECD (c 0.027, MeOH) $\lambda_{max}$ (Δε) 312 (+0.40), 222 (−2.84) nm; $^1$H NMR (CDCl$_3$, 500 MHz) $\delta_H$ 9.50 (1H, s, H-12), 9.39 (1H, s, H-15), 6.70 (1H, dd, J=4.8, 2.5 Hz, H-3), 6.25 (1H, s, H-13), 5.96 (1H, s, H-13), 2.59 (1H, tt, J=12.0, 4.0 Hz, H-7a), 1.55-1.43 (3H, m, H-8b, H-9), 1.36 (2H, m, H-1), 1.21 (1H, m, H-6b), 0.83 (3H, s, H-14); $^{13}$C NMR (CDCl$_3$, 125 MHz) $\delta_C$ 194.9 (CH, C-13), 194.6 (CH, C-15), 154.8 (C, C-11), 153.3 (C, C-4), 142.0 (CH, C-3), 133.4 (CH$_2$, C-12), 43.4 (CH$_2$, C-9), 39.6 (CH$_2$, C-1), 37.0 (CH, C-7), 36.4 (C, C-10), 32.1 (CH, C-5), 27.0 (CH$_2$, C-6, C-8), 26.3 (CH$_3$, C-14), 15.8 (CH$_2$, C-2); ESIMS m/z 255 [M+Na]$^+$, 487 [2M+Na]$^+$. The spectral data is basically consistent with the data in a literature [Bohlmann, F.; Zdero, C.; Cuatrecasas, J.; King, R. M., Robinson, H. *Neue sesquiterpeneund norditerpene aus vertretern der gattung Libanothamnus*. *Phytochemistry*, 1980, 19 (6): 1145-1148].

Example 2

Neuroprotective activity of the compound PFC-37 was tested as follows:

1. PC12 poorly-differentiated cells were cultured in a medium containing Dulbecco's modified Eagle's medium (DMEM) high glucose+10% fetal bovine serum (FBS)+100 U/mL penicillin-streptomycin, in an incubator at 37° C. and 5% $CO_2$.

2. When growing to 80% to 90%, the PC12 poorly-differentiated cells were subjected to trypsin digestion to obtain a cell suspension.

3. The cell suspension was aspirated into a 15 mL centrifuge tube, followed by centrifugation at 800 rpm for 5 min.

4. After the centrifugation, the centrifuge tube was sterilized with alcohol and placed into an ultra-clean bench, and a supernatant was poured into a waste liquid tank.

5. 5 mL of a new complete medium was added, followed by blowing the medium ten times by a pipette to disperse the cells as much as possible, wherein the blowing should not be performed by too large of a force.

6. 0.02 mL of the cell suspension was taken and added to a cell counting plate for counting.

7. The cell suspension was adjusted to have a cell concentration of 1×10$^5$ cells/mL, then added to a 96-well plate by 0.1 mL per well, and incubated in a cell incubator.

8. After 23 h, the original medium was aspirated, and a new medium (the formula of which was the same as that in the above step 1) was added; the compound to be tested was added; and 1 h later, MPP$^+$ was added (a final concentration of the MPP$^+$ in the system was 750 μM).

9. Experimental design: each group was designed and performed for 3 repetitions:

A blank group included only medium.

A model group (MPP$^+$) included medium and MPP$^+$ which was added with a final concentration of 750 μM.

A positive control group (vitamin E) included medium, vitamin E which was added with a final concentration of 0.2 μM, and MPP$^+$ which was subsequently added with a final concentration of 750 μM.

Compound groups (Groups 1 to 5) included the medium, the compound PFC-37 which was added with final concentrations of 5, 2, 1, 0.2 and 0.1 μM, respectively, and MPP$^+$ which was subsequently added with a final concentration of 750 μM.

10. 24 h after adding the MPP$^+$, MTS was added; after 2 h, values were read for detection.

Example 3

Effects of a neuroprotective activity of the compound PFC-37 were tested, and the results are as follows.

The neuroprotective activity data of the compound PFC-37 are shown in Table 1. The compound has a significant protective activity against MPP$^+$-induced PC12 cell injury at concentrations of 1 μM and 2 μM (P<0.001).

TABLE 1

Protective effect of compound PFC-37 on MPP$^+$-induced PC12 cell injury

| Groups | Sample loading | Cell viability (%) |
| --- | --- | --- |
| Blank group | — | 100.00 ± 0.41 |
| Model group (MPP$^+$) | 750 μM MPP$^+$ | 69.46 ± 0.70 |
| Positive control group (vitamin E, VE) | 0.2 μM VE + 750 μM MPP$^+$ | 75.70 ± 0.64*** |
| PFC-37 (Group 1) | 5 μM compound + 750 μM MPP$^+$ | 75.74 ± 0.90*** |
| PFC-37 (Group 2) | 2 μM compound + 750 μM MPP$^+$ | 82.53 ± 0.64*** |
| PFC-37 (Group 3) | 1 μM compound + 750 μM MPP$^+$ | 84.86 ± 0.86*** |
| PFC-37 (Group 4) | 0.2 μM compound + 750 μM MPP$^+$ | 69.82 ± 0.86 |
| PFC-37 (Group 5) | 0.1 μM compound + 750 μM MPP$^+$ | 69.46 ± 0.95 |

Notes to Table 1:
**represents P < 0.01, and
***represents P < 0.001, compared with the model group.

Example 4

A drug for treatment of a nervous system disease was prepared by mixing the following components in weight percentage: 20% to 80% of PFC-37, 2% to 20% of a dispersant, 3% to 5% of a disintegrant, 3% to 8% of an emulsifier, 0.2% to 2% of an adhesive, 0.5% to 10% of a wetting agent and a filler as a balance. The drug for treatment of a nervous system disease with the PFC-37 as an active ingredient was prepared according to a conventional preparation method for drugs.

Example 5

An oral liquid formulation was prepared using PFC-37 as an active ingredient according to a conventional preparation method for oral liquid.

Example 6

A capsule, a granule or an electuary was prepared as follows: an excipient was added to PFC-37 at a weight ratio of PFC-37: excipient of 5:1 to prepare the capsule or the granule or the electuary.

Example 7

A dietary supplement composition was prepared by mixing the following components, in percentage by weight: 20% to 80% of PFC-37 and 80% to 20% of a conventional food adjuvant.

The above descriptions are merely preferred implementations of the present disclosure. It should be noted that a person having ordinary skill in the art may further make several improvements and modifications without departing from the principle of the present disclosure, and such improvements and modifications shall be deemed as falling within the protection scope of the present disclosure.

What is claimed is:

1. A method of treating Parkinson's disease, comprising administering a pharmaceutical composition comprising a therapeutically effective amount of (5R,7R,10R)-12,15-dioxo-α-selinene to a subject in need thereof.

2. The method of claim 1, wherein the pharmaceutical composition further comprises a pharmaceutically acceptable carrier.

3. The method of claim 2, wherein the pharmaceutically acceptable carrier is selected from the group consisting of water, glucose, lactose, acacia, and combinations thereof.

4. The method of claim 1, wherein the pharmaceutical composition further comprises a stabilizer, a thickener, a colorant, a flavoring agent, or combinations thereof.

5. The method of claim 1, wherein the pharmaceutical composition comprises 0.1% to 99% by weight (5R,7R,10R)-12,15-dioxo-α-selinene.

6. The method of claim 5, wherein the pharmaceutical composition comprises 0.5% to 90% by weight (5R,7R,10R)-12,15-dioxo-α-selinene.

7. The method of claim 1, wherein the pharmaceutical composition is a formulation selected from the group consisting of:
   a formulation for oral administration selected from the group consisting of a granule, a capsule, a tablet, and an electuary; and
   a formulation for non-oral administration selected from the group consisting of an injection, an infusion, and a suppository.

8. The method of claim 7, wherein the formulation for oral administration further comprises an excipient, a disintegrant, an adhesive, a lubricant, an antioxidant, a coating agent, a colorant, a flavoring agent, a surfactant, or combinations thereof.

9. The method of claim 8, wherein:
   the formulation for oral administration comprises an excipient wherein the weight ratio of (5R,7R,10R)-12,15-dioxo-α-selinene to excipient is 5:1; and
   the formulation for oral administration is in the form of a capsule.

10. The method of claim 1, wherein the pharmaceutical composition comprises:
    20% to 80% by weight of (5R,7R,10R)-12,15-dioxo-α-selinene;
    2% to 20% by weight of a dispersant;
    3% to 5% by weight of a disintegrant;
    3% to 8% by weight of an emulsifier;
    0.2% to 2% by weight of an adhesive;
    0.5% to 10% by weight of a wetting agent; and
    the balance is a filler.

11. The method of claim 1, wherein the pharmaceutical composition is administered in a dosage of 1 mg to 100 mg per day to an adult subject in need thereof.

12. The method of claim 1, wherein the pharmaceutical composition is a dietary supplement further comprising a food adjuvant.

13. The method of claim 12, wherein the dietary supplement comprises:
    20% to 80% by weight of (5R,7R,10R)-12,15-dioxo-α-selinene; and
    80% to 20% by weight of a food adjuvant.

* * * * *